United States Patent [19]

Miyaki et al.

[11] Patent Number: 4,503,821

[45] Date of Patent: Mar. 12, 1985

[54] APPARATUS AND METHOD FOR CONTROLLING AMOUNT OF FUEL INJECTED INTO ENGINE CYLINDERS

[75] Inventors: Masahiko Miyaki, Oobu; Toshimi Matsumura; Akira Masuda, both of Aichi; Sinya Sumitani, Kariya; Takashi Hasegawa, Tajimi; Takahiro Hayakawa, Kariya, all of Japan

[73] Assignee: Nippondenso Co., Ltd., Kariya, Japan

[21] Appl. No.: 575,385

[22] Filed: Jan. 30, 1984

[30] Foreign Application Priority Data

Jan. 31, 1983 [JP] Japan .................... 58-15306

[51] Int. Cl.³ .............................. F02D 31/00
[52] U.S. Cl. ..................... 123/357; 123/488
[58] Field of Search ............... 123/357, 358, 359, 488; 73/119 A

[56] References Cited

U.S. PATENT DOCUMENTS

| | | | |
|---|---|---|---|
| 3,867,918 | 2/1975 | Williams et al. | 123/357 |
| 4,279,229 | 7/1981 | Arnold et al. | 123/357 |
| 4,372,266 | 2/1983 | Hujama et al. | 123/357 |

FOREIGN PATENT DOCUMENTS

| | | | |
|---|---|---|---|
| 32027 | 2/1982 | Japan | 123/357 |
| 67936 | 4/1983 | Japan | 123/357 |

*Primary Examiner*—Magdalen Y. C. Moy
*Attorney, Agent, or Firm*—Cushman, Darby & Cushman

[57] ABSTRACT

The engine speed is periodically detected at every predetermined crankshaft angles for obtaining a plurality of engine speed data whose number equals an integral multiple of the number of cylinders of an internal combustion engine. Either maximum or minimum values among the plurality of engine speed data is determined, and such operations are repeated for a duration covering all power strokes within all the cylinders, thereby obtaining a plurality of sets of engine speed data. Then the order of engine speed data giving the maximum or minimum value within each set is obtained, and majority decision is effected to determine which order of data gives the maximum or minimum most frequently throughout all the sets. The difference between the maximum and minimum values is obtained for each set, and the amount of fuel to be supplied to the engine is controlled so that the difference becomes common to all the cylinders. The fuel amount control may be effected by means of an actuator which controls the position of a spill ring of a distributor injection pump.

10 Claims, 11 Drawing Figures

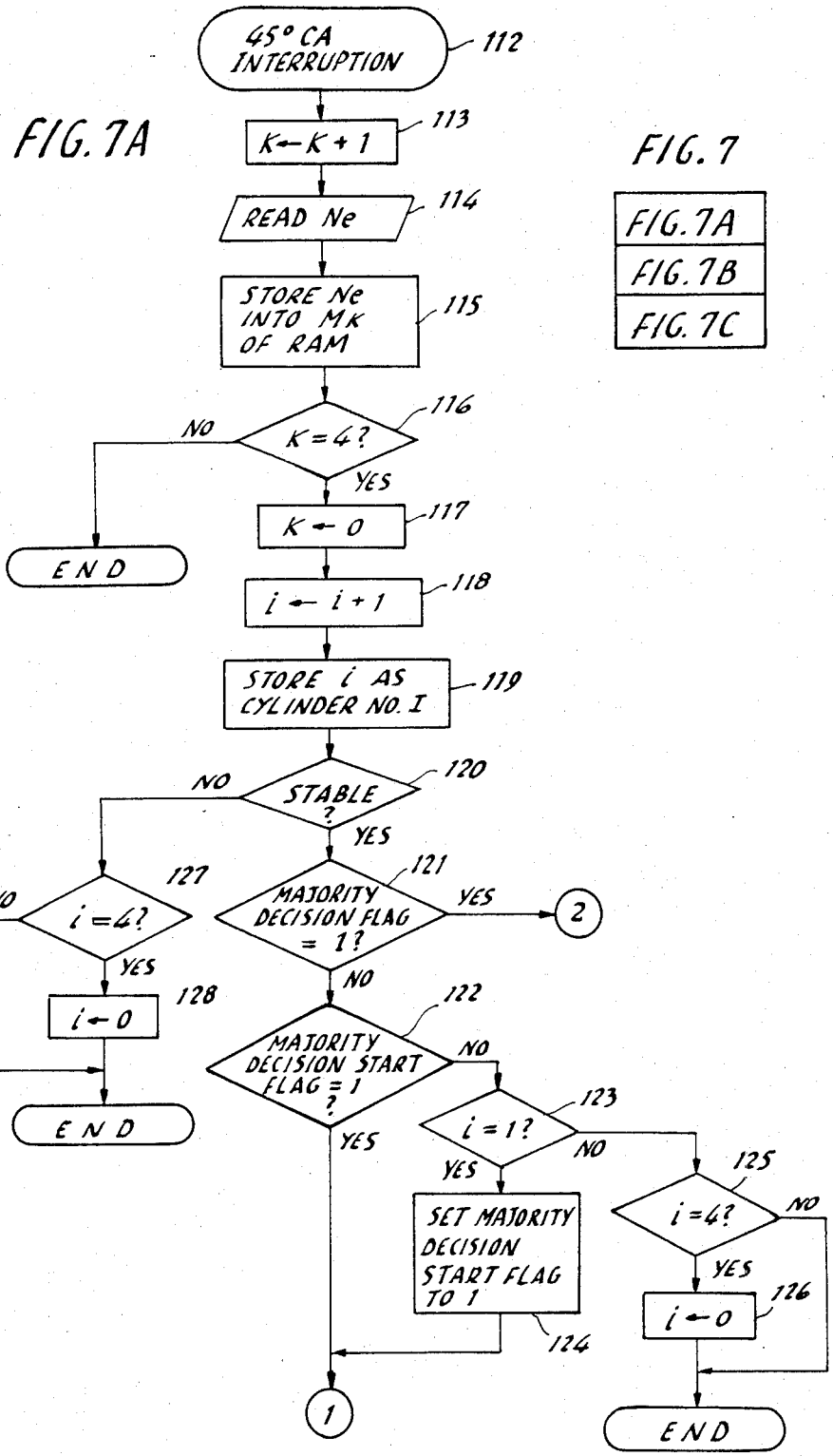

APPARATUS AND METHOD FOR CONTROLLING AMOUNT OF FUEL INJECTED INTO ENGINE CYLINDERS

BACKGROUND OF THE INVENTION

This invention relates generally to apparatus and method for controlling amount of fuel injected into engine cylinders by means of an injection pump or the like.

The amount of fuel injected into a multi-cylinder internal combustion engine has been conventionally controlled uniformly throughout all the cylinders in both gasoline engines and diesel engines. Namely, according to known electronic fuel injecting systems for gasoline engines, the valve-opening duration of electromagnetic valves respectively provided to individual cylinders is controlled such that the valve opening duration is common to all the cylinders, while according to known electronically controlled diesel engines, which have been recently put in practical application stage, the position of an injection amount-controlling member, such as a control rack or a spill ring, is controlled where the controlling member is common to all the cylinders.

Although such a control effected uniformly throughout all the cylinders of an engine is simple, there arises a problem of variation or scattering in injecting fuel amount throughout the cylinders. Therefore, in conventional apparatus high manufacturing precision is required when manufacturing various parts, such as injection valves, injection conduits or the like, used in the injection system to reduce such variation throughout the cylinders. Such high manufacturing precision or accuracy necessarily increases the manufacturing cost. Furthermore, even though the precision of used parts have been increased to its limit so that variation throughout cylinders is minimized, the amount of fuel actually injected into engine cylinders has a chance to suffer from variation or scatter throughout cylinders due to secular change or external disturbance, such as a variation in actuating timing of intake and/or exhaust valves or the like.

Such variation in amount of fuel injected into cylinders of an engine results in irregular rotation of the engine crankshaft. Especially, during idling such irregular rotation is uncomfortable and noisy. Generally speaking, the engine rotational speed during idling is set to a low value in view of suppression of fuel cost. On the other hand, it is desired, especially for passenger automobiles, that engine rotation during idling is as smooth as possible thereby providing comfortable environment. Particularly, the above-mentioned irregular rotation during idling is desired to be reduced to achieve stable engine rotation.

SUMMARY OF THE INVENTION

The present invention has been developed in order to remove the above-described drawbacks inherent to the conventional fuel supply system of an internal combustion engine.

It is, therefore, an object of the present invention to provide new and useful method and apparatus for controllng the amount of fuel injected into engine cylinders so that torque generation is uniform throughout all the cylinders.

According to a feature of the present invention engine speed is periodically detected at every predetermined crankshaft angles for obtaining a plurality of engine speed data whose number equals an integral multiple of the number of engine cylinders. Either maximum or minimum values among the plurality of engine speed data is determined, and such operations are repeated for a duration covering all power strokes within all the cylinders, thereby obtaining a plurality of sets of engine speed data. Then the order of engine speed data giving the maxium or minimum value within each set is obtained, and majority decision is effected to determine which order of data gives the maximum or minimum most frequently throughout all the sets. The difference between the maximum and minimum values is obtained for each set, and the amount of fuel to be supplied to the engine is controlled so that the difference becomes common to all the cylinders. The amount of fuel supplied to the engine is basically determined by using engine operational parameters, and a basic fuel amount is corrected by using the difference. The fuel amount control may be effected by means of an actuator which controls the position of a spill ring of a distributor injection pump.

BRIEF DESCRIPTION OF THE DRAWINGS

The object and features of the present invention will become more readily apparent from the following detailed description of the preferred embodiments taken in conjunction with the accompanying drawings in which:

FIGS. 7, which includes FIGS. 7A, 7B and 7C, is a flowchart showing an interrupt service routine of the program for the computer of FIG. 5.

The same or corresponding elements and parts are designated at like reference numerals throughout the drawings.

DETAILED DESCRIPTION OF THE INVENTION

Figure 1:
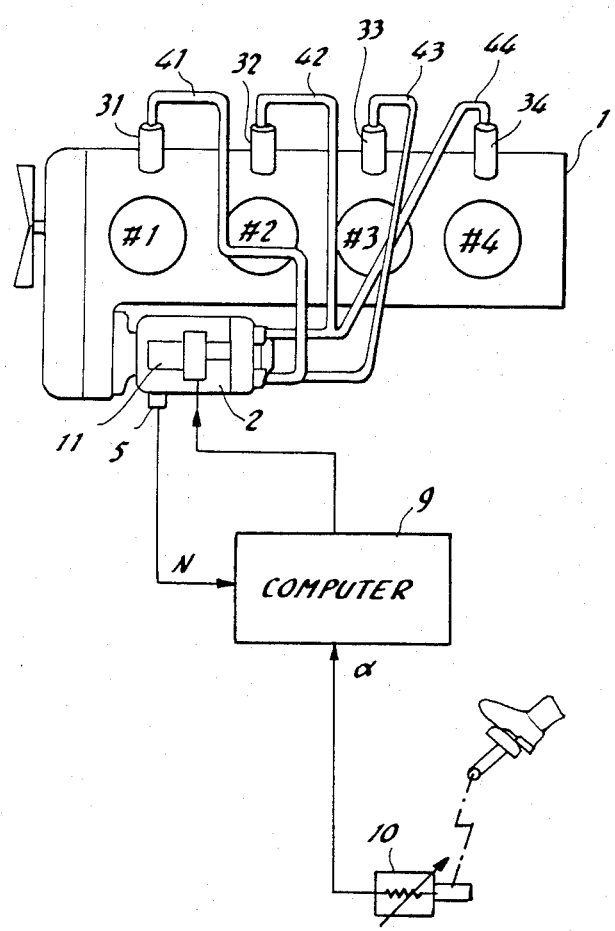
FIG. 1 is a schematic diagram showing an embodiment of the present invention.

Referring now to FIG. 1, a schematic diagram of an embodiment of the present invention is shown. FIG. 1 shows a known 4-cylinder diesel engine 1 arranged to receive fuel from a distributor injection pump 2 (for instance Bosch VE type pump) equipped with an electronic injecting amount control device (so called electronic governer). The injection pump 2 is driven at a speed one half the engine speed via an unshown belt or gear mechanism coupled to the engine crankshaft. Injection nozzles 31 through 34 are provided to individual cylinders of the engine 1 where the injection nozzles 31-34 are respectively coupled by injection steel conduits 41-44 to the distributor injection pump 2. The injection pump 2 is arranged to pressurize fuel led therein from an unshown fuel tank to deliver the same under pressure to respective injection nozzles 31-34 at predetermined timings so that a predetermined amount of fuel is supplied to combustion chambers or auxiliary chambers of respective cylinders of the engine 1.

The injection pump 2 is equipped with a rotational speed sensor 5 which produces an output signal indicative of the rotational speed of a rotary member of the injection pump 2. Since this rotary member rotates in synchronism with the engine rotation, the output signal from the rotational speed sensor 5 also represents the speed of the engine 1. The output signal from the rotational speed sensor 5 is fed to an electronic control unit (ECU) 9 which also receives a signal from a potentiometer 10 associated with an accelerator pedal. The electronic control unit 9 produces an output control signal by using these input signals to control the injection pump 2 so that desired amount of fuel is injected as will be described in detail hereinlater.

Figure 2:
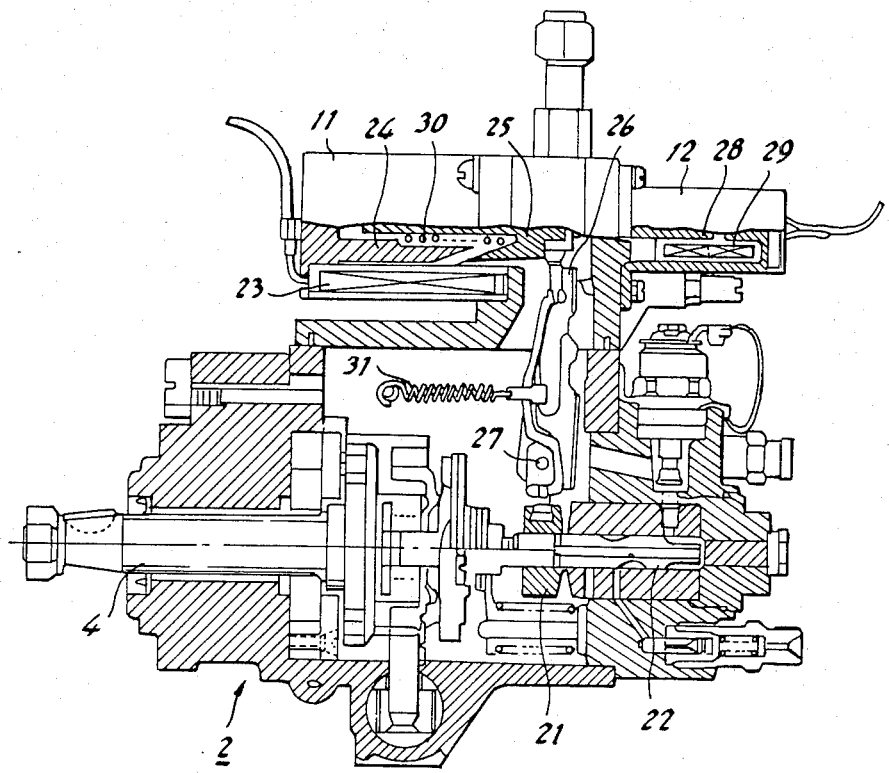
FIG. 2 is a partial cross-sectional view of the distributor injection pump of FIG. 1.
Figure 3:
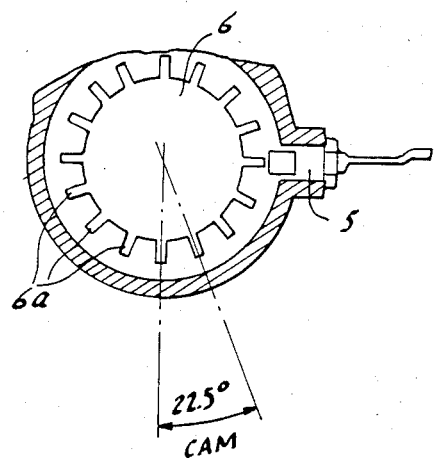
FIG. 3 is a cross-sectional view of the engine speed sensor of FIG. 1.

FIG. 2 shows a cross-sectional view of the injection pump 2 shown in FIG. 1. The injection pump 2 comprises a drive shaft 4 driven by the engine crankshaft. The above-mentioned rotational speed sensor 5 is arranged to detect the rotational speed of the drive shaft 4. Namely, the drive shaft 4 is equipped with a disc 6 having 16 projections or teeth 6a at its periphery as shown in FIG. 3, and an electromagnetic pickup functioning as the rotational speed sensor 5 is provided to be close to the locus of the projections 6a. The projections 6a are equiangularly spaced, and therefore, an angle between two consecutive projections with respect to the center of the disc 6 is 22.5 degrees. Since the drive shaft 4, and therefore the disc 6 rotates once per two revolutions of the engine crankshaft, eight projections 6a pass the sensor 5 to cause the same to produce eight pulses per one revolution of the engine crankshaft. In other words, the rotational speed sensor 5 produces a pulse output signal each time the engine crankshaft rotates 45 degrees. The pulse output signal from the sensor 5 is referred to as a signal N. This signal N represents not only the rotational speed of the engine 1 but also rotation of the engine crankshaft by a given crank angle, and is fed to a computer used as the electronic control unit 9.

The above-mentioned potentiometer 10 produces a voltage signal indicative of the stroke of the accelerator pedal, thereby representing the load of the engine 1. Therefore, this potentiometer 10 is referred to as a load sensor hereinafter. The computer 9 thus determines amount of fuel to be injected into engine cylinders, which amount is most suitable for engine operating conditions varying time to time. In order to control the fuel injection amount an injection amount control actuator 11 such as a linear solenoid, included in the injection pump 2 is controlled by the output control signal from the computer 9.

A detailed structure of the distributor injection pump 2 will be described with reference to FIGS. 2 and 3. The injection pump 2 is basically the same as known VE type injection pumps made by Bosch such that the mechanism for fuel intaking, fuel transmission under pressure, and fuel distribution, and injection timing are the same as those in the VE type injection pumps. Therefore description of such known features is omitted. However, the injection pump 2 used in the present invention differs from the known pump in that the axial displacement of a spill ring 21, which is a member for adjusting spilling amount of fuel, is controlled by the above-mentioned actuator 11 using the linear solenoid thereby controlling injection amount by the computer 9.

When the control output signal from the computer 9 is applied to a coil 23 of the actuator 11 having a stator 24 and a movable core 25, a magnetic force proportional to the intensity of the control signal, occurs between the stator 24 and the movable core 25. As a result, the movable core 25 is drawn leftward in the drawing against a biasing force of a spring 30. As the movable core 25 moves leftward, a lever 26 attached to the movable core 25 at its one end is rotated counterclockwise in the drawing around a pivot 27. The other end of the lever 26 is connected to a spill ring 21, and therefore the spill ring 21 is moved to the right in the drawing when the lever rotates counterclockwise. In a VE type injection pump, the larger the rightward movement of the spill ring 21, the later the spill timing, and therefore an instant of termination of fuel injection is retarded. As a result, the amount of injecting fuel is increased. As described in the above, the increase in the current to the actuator 11 results in increase in the amount of injecting fuel, while the decrease in the current results in the decrease in the fuel amount. Accordingly, when the current to the actuator 11 is controlled by the computer 9, it is possible to control the amount of fuel to be injected into engine cylinders.

A position sensor 12 is provided such that it is attached coaxially with the actuator 11 for increasing the control accuracy by correcting the current to the actuator 11. The position sensor 12 comprises a probe 28, which is coaxial and integral with the moving core 25 and made of ferrite or the like, and a position-detecting coil 29.

Fuel injecting amount is normally controlled by the computer 9 by using the above-mentioned signal N and the output signal from the load sensor 10 such that the current to the actuator 11 is controlled so that the position of the movable core 25 thereof is controlled to determine an optimal position of the spill ring 21. However, when the fuel amount is determined by the above normal control, the amount of fuel injected into respective cylinders of the engine 1 is uniformaly determined. Therefore, if there is a variation throught valve-opening pressures of respective injection nozzles 31-34, the amount of fuel injected into respective cylinders suffers from scattering accordingly. In order to minimize such variation throughout respective cylinders, a correction processing is effected by way of operation of the computer 9 so that the object of the present invention set forth at the beginning of this specification will be attained.

Figure 4:
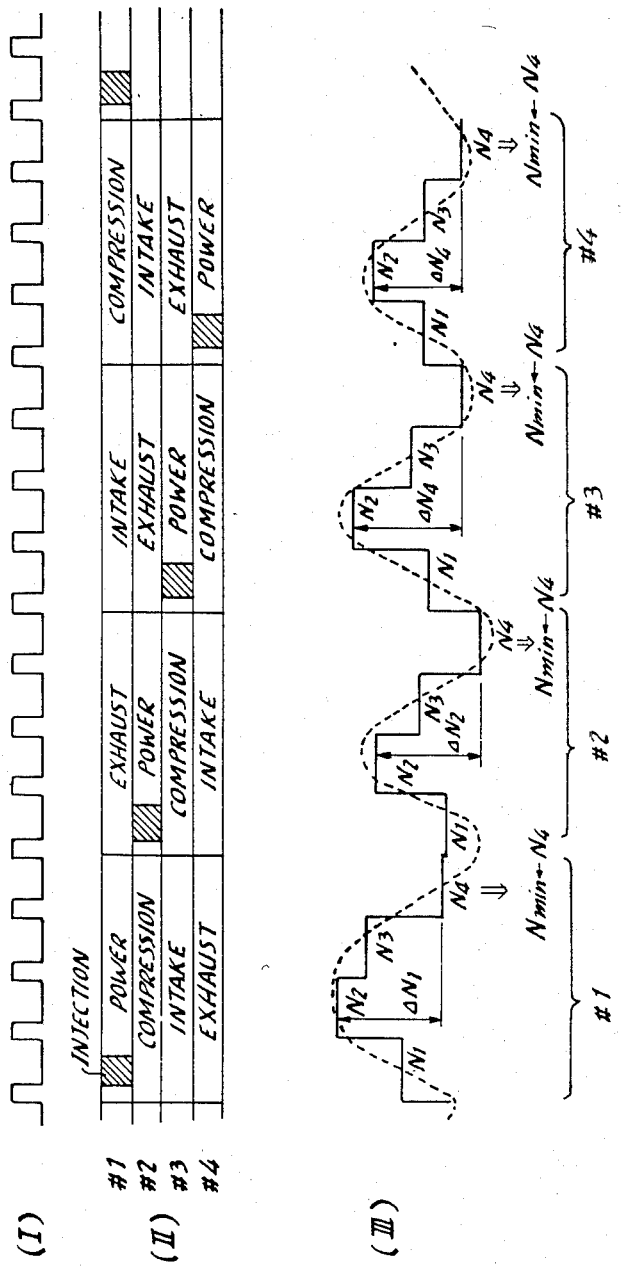
FIG. 4 is an explanatory timing chart showing the operation of the embodiment of FIG. 1.

First of all, the concept of the control for the above-mentioned correction processing will be described with reference to FIG. 4. In FIG. 4, the reference (I) indicates the above-mentioned signal N, while the reference (II) indicates a sequence chart of the operation of the 4-cylinder diesel engine 1. In the sequence chart (II) of FIG. 4, hatched portions show timings of fuel injection to respective cylinders, while references #1 to #4 indicate cylinder numbers. During idling, to which the present invention is mainly adapted, fuel injection is effected when several degrees of crank angle are passed after the top dead center. The reference (III) in FIG. 4 indicates an output signal obtained by frequency-to-voltage converting the signal N by the computer 9. This signal (III) represents variation in rotation at every 45 degrees of the engine crankshaft rotation. Observing precisely the signal (III) in correspondence with the injection (intake) stroke and power (combustion) stroke within each cylinder, the rotational speed represented by the signal N rapidly increases immediately after combustion, and then lowers as a compression stroke within a next cylinder starts taking place.

Therefore, minute change of the signal N has a period corresponding to one half the engine rotation, while it is known from experiments that a maximum value and a minimum value of the change appears at every 90 degrees of the engine crankshaft rotation. Asssuming that the difference between the maximum and minimum values of the change in the rotational speed of each cylinder is expressed in terms of $\Delta Ni$ (wherein i is a numeral indicative of a number of a cylinder on power stroke), it is known that the value of $\Delta Ni$ is in correlation with generated torque. Therefore, if the value of $\Delta Ni$ is made common to all the cylinders, smooth rotation during idling would be resulted. To this end, in the present embodiment a mean value of $\Delta N1$ through $\Delta N4$ is obtained such that $$\Delta \overline{N} = \sum_{i=1}^{4} \Delta Ni/4,$$

and then the amount of fuel to be injected into individual cylinders is controlled so that each value of $\Delta Ni$ equals the mean value $\Delta \overline{N}$. In practice, the mean value $\Delta \overline{N}$ is obtained by using information of newest 4 times of combustions each time $\Delta Ni$ is detected. Then when $\Delta Ni$ is greater than $\Delta \overline{N}$, the amount of fuel fed to the cylinder is reduced. On the other hand when $\Delta Ni$ is smaller than $\Delta \overline{N}$, the amount of fuel fed to the cylinder is increased.

In the embodiment, since the signal N is a pulse train whose each pulse is simply produced at every 45 degrees of the crankshaft rotation, it cannot be determined which cylinder is the one on combustion (power stroke) from the information of the signal N. Although it is possible to determine which cylinder is on combustion if another sensor and an associated disc attached to the cam shaft 4 of the injection pump 2 are provided to detect a particular timing, such as top dead center, of a particular cylinder, the determination of cylinders is effected by using a special program for the computer 9 in the embodiment.

Figure 5:
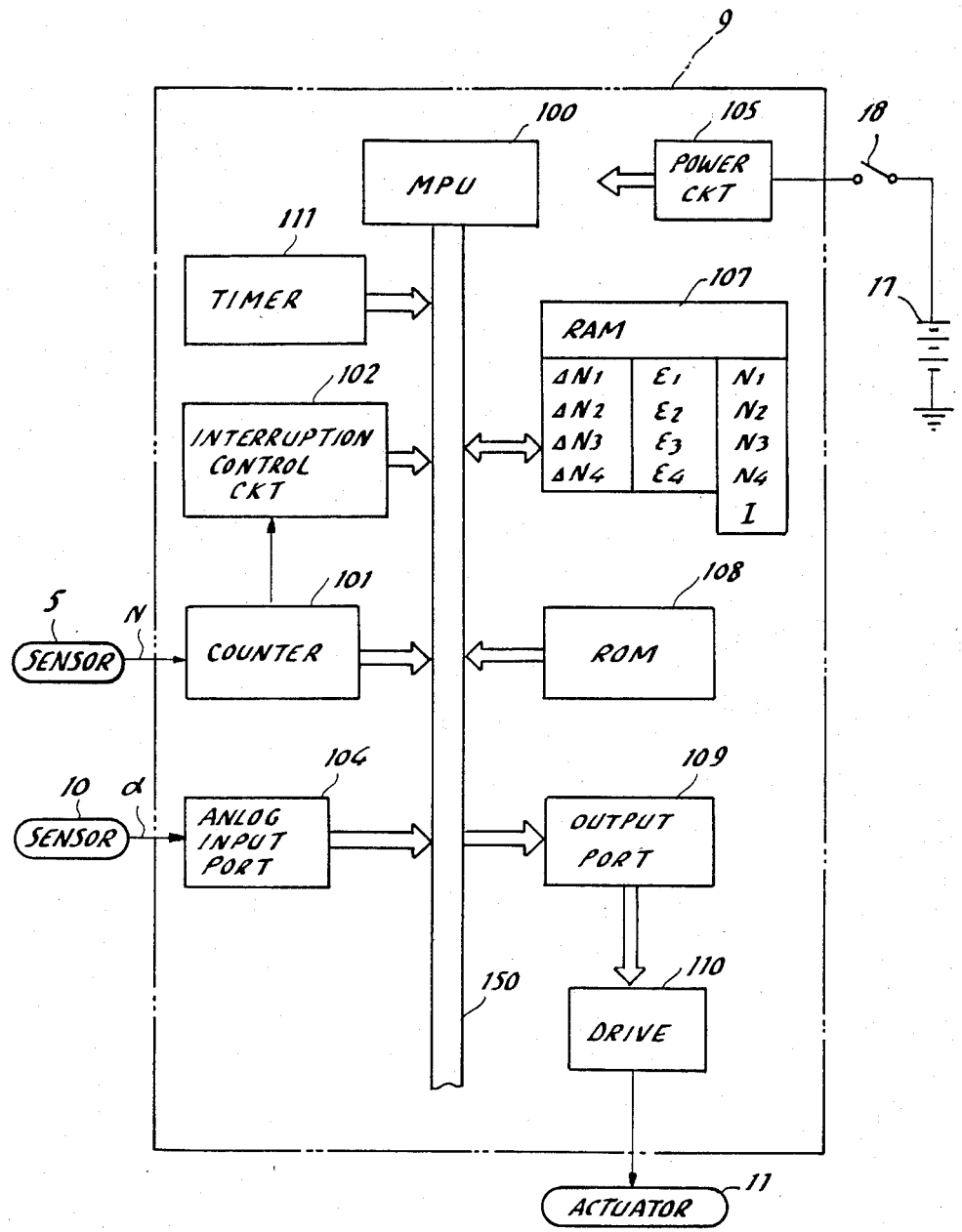
FIG. 5 is a schematic block diagram of the computer of FIG. 1.

Now detailed structure and operation of the embodiment will be described with reference to FIGS. 5, 6, 7A to 7C. FIG. 5 shows a schematic diagram of the computer 9 used as the electronic control unit and its peripheral circuits. In FIG. 5, the reference 100 is a central processing unit (CPU) or a microprocessor (MPU) which performs operations necessary for the control of the amount of fuel respectively fed to engine cylinders. The reference 101 is a counter responsive to the signal N. Namely, the counter 101 counts the number of pulses included in the signal N sent from an electromagnetic pickup operating as the rotational speed sensor 5, and the count per unit time represent the engine rotational speed. The counter 101 also produces an interruption-control signal in synchronization of the engine rotation, and sends the interruption-control signal to an interruption control circuit 102 at an interval of 45 degrees of the rotational angle of the cam shaft 4.

The interruption control circuit 102 sends an interruption signal via a common bus 150 to the CPU 100 in response to the interruption-control signal.

The reference 104 is an analog input port comprising an analog multiplexer and an analog-to-digital (A/D) converter. The analog input port 104 is responsive to the load signal indicative of the opening degree of the accelerator pedal, from the engine load sensor 10 for A/D converting the same to prepare digital data which is read into the CPU 100. Output data from these circuits or units 101, 102 and 104 is transmitted via the common bus 150 to the CPU 100. The reference 105 is a power source circuit which is connected via a key switch 18 to a battery 17 mounted on a motor vehicle for the supply of power to the computer 9.

The reference 107 is a random-access memory RAM which is capable of reading and writing data and is temporarily used during the execution of a program. The RAM 107 has an address space for storing various data, such as increment in rotational speed $\Delta N1$ to $\Delta N4$ at every combustion, correction amounts e1 to e4 used for correcting the current to the actuator 11 each time of combustion, rotational speed data N1 to N4 inputted at every 45° CA (crank angle) and stored till the end of power stroke, and determined cylinder number I.

The reference 108 is a read-only memory in which operational program of the computer 9 and various constants are prestored.

The reference 109 is an output port which sets the amount of the control current, which is fed to the actuator 11, in a drive circuit 110 by using the result of calculation executed by the CPU 100 so that the drive circuit 110 produces the control current by converting the output signal from the output port 109 to an actual driving current fed to the above-mentioned linear solenoid actuator 11.

The reference 111 is a timer which measures lapse of time to send the same to the CPU 100. As described in the above, the counter 101 produces the interruption-control signal at every 45° CA by counting the number of pulses of the signal N to cause the interruption control circuit 102 to produce the interruption signal. Therefore, the CPU 100 executes an interrupt service routine periodically as will be described hereinlater.

Figure 6:
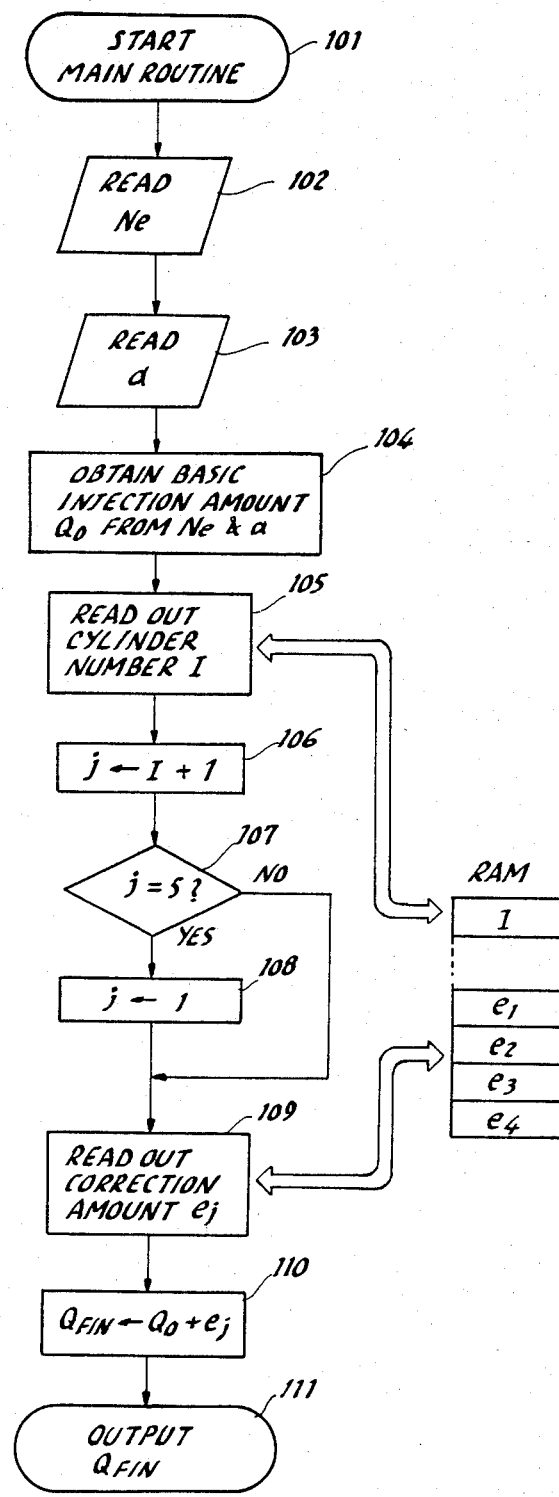
FIG. 6 is a flowchart showing a main routine of the program for the computer of FIG. 5.

The operation of the computer 9 for the control of fuel injection will be described hereinafter with reference to flowcharts of FIGS. 7A to 7C. FIG. 6 shows a main routine executed normally. It is desirable that control sequence is designed so that the main routine is executed at least once within 180° CA during idling. Starting the operation of the main routine at a starting step 101, in a following step the rotational speed Ne of the engine at the present time is read and stored. The value of the rotational speed Ne may be obtained by averaging two data obtained in the presence of two consecutive pulses of the signal N so that an average rotational speed Ne for 90° CA is obtained. Subsequently, in a step 103 the engine load $\alpha$, which is the output from the engine load sensor 10 is read. Then in a step 104, a basic injection amount Qo is determined by using the value of the engine speed Ne and the engine load $\alpha$. In detail, a value or data indicative of a basic injection amount Qo may be picked up from a 2-dimensional map prestored in the ROM 108 in correspondence with various values of Ne and $\alpha$. In practice, the basic injection amount may be replaced with the position of the spill ring 21 corresponding to the basic injection amount.

In a following step 105, a cylinder-determination number I stored in the RAM 108 is read out, and in a step 106, a value "j" is obtained by adding 1 to the number I so that the value "j" will be used for a cylinder-determination number I for subsequent injection. As will be described later in connection with the interrupt service routine, the number I indicative of a cylinder number on combustion is renewed during 180° CA including a given power stroke after the renewal of correction amounts for injection with increment of rotational speed before and after combustion being calculated. Therefore, till the end of 180° CA including a power stroke within a given cylinder (for instance, a third, cylinder), a number of a former cylinder (I=2) is being stored. As a result, it is necessary to change the cylinder number to a number of a cylinder (the third cylinder in this case) whose injection amount is to be controlled. Namely, it is necessary to set the value of "j" as j=I+1. However, when I is 4, I+1 makes 5, which should be 1 since the first cylinder has to be designated after the fourth cylinder. Therefore, when the value of "j" equals 5, "j" is reset to 1 (see steps 107 and 108).

In a following step 109, correction amounts e1 to e4 for respective fuel injections to respective cylinders are read out, where the correction amounts e1 to e4 are successively renewed in the interruption service routine as will be described hereinlater. The correction amounts e1 to e4 are read out in accordance with the cylinder number "j" such that e3 is read out when "j"=3. Then in a step 110, the correction amount ej is added to the basic fuel injection amount Qo to obtain a final injection amount $Q_{FNL}$. This final injection amount $Q_{FNL}$ is outputted in a following step 111 to control the actuator 11. In paractice, it is necessary to correct the basic fuel injection amount Qo by the temperature of engine coolant, ON/OFF state of a starter switch, intake air pressure or the like. However, such correction is omitted for simplicity.

The interrupt service routine will be described with reference to FIG. 7 comprising FIGS. 7A, 7B and 7C. The interrupt service routine is provided to determine the cylinder number whose fuel injection amount is to be controlled, and to obtain and renew the above-mentioned correction amounts e1 to e4 used for absorbing or smoothing variation in rotational speed or torque.

As described in the above, the interrupt service routine is periodicaly executed at every 45° CA. Although no step is shown, the computer 9 is arranged to be initialzied when the key switch 18 is turned on for example. With the initialization, variables "i" and "k", which will be described hereinafter, and contents of the RAM 107 are all reset or initialized to zero. When entering into the interrupt service routine via a step 112, the variable "k", which indicates the number of times of passing 45° CA, is increased by one. At the beginning since "k" has been reset to zero, "k" becomes 1. In a following step 114, the rotational speed data Ne is read. It is to be noted that this rotaional speed data Ne has to be data at each 45° CA. In other words, an average rotational speed such as used in the main routine cannot be used since it is needed to precisely detect the engine engine as minute as possible. The engine speed data Ne is stored in an appropriate area of the RAM 107 corresponding to the variable "k". Namely, assuming that four areas M1 to M4 are provided within the RAM 107 for storing the engine speed data Ne, when k=3, Ne is stored in an area M3. In a step 116, it is determined whether "k" equals 4 or not. In the case that the interrupt service routine has been executed four times so that the storing areas M1 to M4 have been filled with engine speed data, namely, when k=4, a step 117 is executed to reset "k" to zero. On the other hand, when k≠4, the interrupt service routine is terminated.

In a step 118, a cylinder-determination number "i" whose initial value is zero is increased by 1. This number "i" is used to determine which cylinder has been subjected to injection during 180° CA (=45° CA×4) from the step 112 to the step 117. However, the number "i" does not necessarily indicate an actual cylinder number, and is not necessarily required to represent the same. Namely, the number "i" is used to simply determine the order of injection so that the computer 9 is capable of controlling fuel injection amount for individual cylinders in sequence. The number "i" is stored in the RAM 107 as the above-mentioned cylinder-determination number I to be used in both the main routine and the interrupt service routine for the recognition of cylinder number. Although both "i" and I are used to indicate the cylinder number, "i" is separately processed since it may assume a number different from I.

In a step 120, it is determined whether the engine 1 is in steady state, such as stable idling state or low-speed steady state, or not. The stable idling state may be detected by way of an unshown idle switch, which detects that the accelerator pedal is not depressed, and by detecting whether the engine speed is within a predetermined low range. The low-speed steady state may also be detected when the engine speed is within a low range for a predetermined period of time. Then only when the engine 1 is in steady state, steps following a step 121 are executed for the determination of the cylinder number and averaging process of the engine rotation variation. On the contrary, when it is determined that the engine is unsteady state, steps 127 and 128 if appropriate are executed to terminate the interrupt service routine.

These steps 127 and 128 are provided to reset the cylinder number "i" to zero when "i" equals 4 so that fuel amount correction will be peformed from the first cylinder (i=1) when the interrupt service routine is executed subsequently.

In a step 121, it is determined whether a majority decision flag, which indicates the completion of preparation for the correction of engine rotation variation, has been turned on or set to logic "1". If the majority decision flag has been set to logic "1", steps following ② shown in FIG. 7C are executed to correct and absorb rotation variation. On the other hand, if the preparation has not yet been completed, namely if the majority decision flag is logic "0", steps following a step 122 are executed. The steps 122 through 126 are a determination branch so that the above-mentioned preparation for the correction of engine rotation variation is started from a state of i=1, namely from a cylinder recognized as a first cylinder by the computer 9. Therefore, the following processings are started after i=1.

Figure 7B:
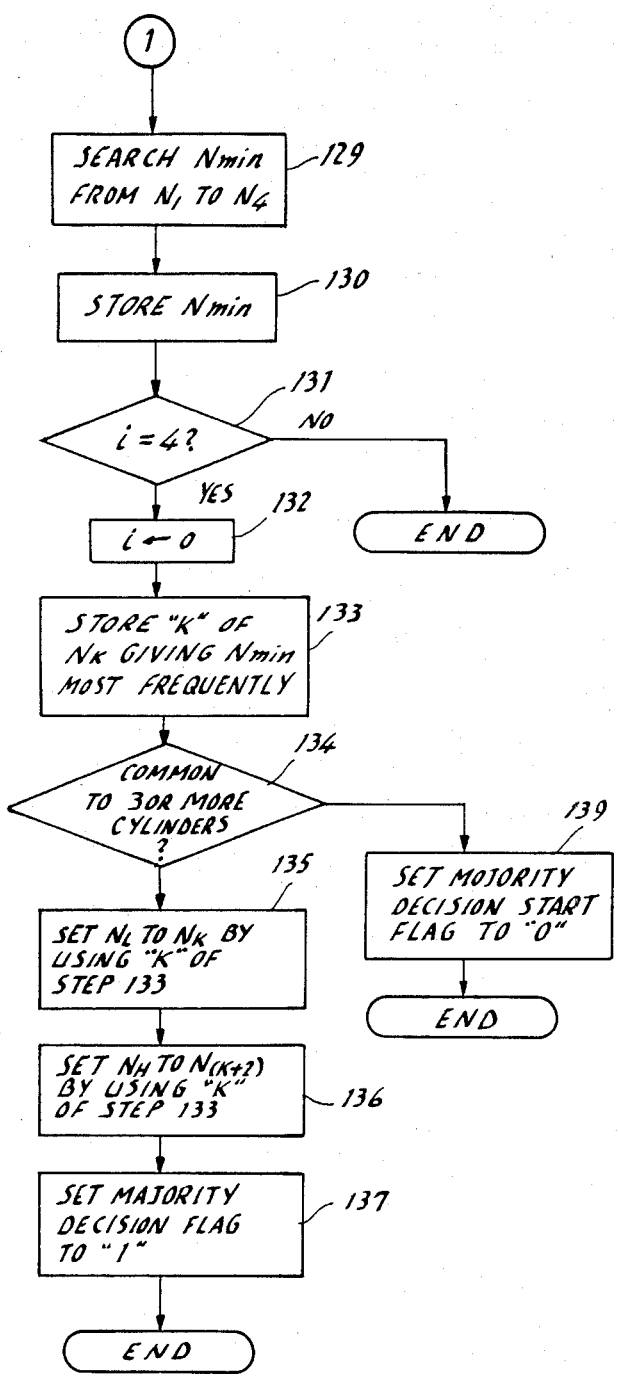

In a step 129 of FIG. 7B, a minimum value Nmin among four data N1 to N4 of engine speed data Ne obtained during 180° CA is obtained. Then in a step 130, the order of Nmin within the four data N1 to N4 is stored. For instance, in the case of the example (III) of FIG. 4, since N4 is minimum, "4" is stored. In a step 131, it is determined whether the processings until now have been effected in connection with all the four cylinders, i.e. throughout 720° CA. To this end it is determined whether "i" equals 4 or not. When "i" is samller than 4, the interrupt service routine is terminated. On the other hand, when i=4, namely when all the numbers, which are expressed by Nk, respectively indicative of the order of minimum values Nmin for the four cylinders have been stored, the value of "i" is reset to 0 in a step 132.

In a step 133, the numbers "k" representing the order of the minimum rotational speed Nmin within each 180° CA of each power stroke within each cylinder are compared with each other to obtain a number which exhibits Nmin most frequently. To this end decision by majority is effected, and a resulted number is then stored. In the case of FIG. 4, since N4 is always minimum within each 180° CA, "4" is stored as the number. In a step 134, it is determined whether the result of the step 133 is common to three or more cylinders. If the determination in the step 134 is NO, it is regarded that some external disturbances are given to the processings hitherto. Namely, a step 139 is executed to turn off or set a majority decision starting-flag to logic "0", and the interrupt service routine is terminated. On the other hand, if the number "k" indicative of the order of the minimum engine speed Nmin is common to three or more cylinders, namely if the timing of Nmin is common to majority cylinders, the value Nk obtained in the step 133 is fixed as $N_L$ formally in a step 135.

The number "k" indicative of a timing in which the engine speed is regarded to assume a minimum value $N_L$ within 180° CA, and this timing "k" will be used as a timing for a further interruption as will be described hereinlater. In a step 136, a timing at which a maximum engine speed is obtained is regarded to correspond to a timing which comes two timings after the minimum engine speed timing. Such determination or regarding can be made since it is known that maximum engine speed timing usually comes two timings after the minimum engine speed timing from results of experimentation. Namely, the number of timing regarded as the order of a timing giving the maximum engine speed is determined as "k+2", and therefore the engine speed N(k+2) determined thereby is fixed as $N_H$. In the example of FIG. 4, $N_H$ becomes N2 because $N_L$ is N4. In a following step 137, the majority decision flag, which indicates that all necessary preparation for the correction and absorption of the rotational speed variation have been completed, is turn on or set to logic "1" to terminate the interrupt service routine. This preparation processing is referred to as majority decision processing hereinafter, and this majority decision processing is required to be executed only once after the engine is put in stable state after the key switch 18 is turned on, and in subsequent interruptions the operational flow branches off from the step 121 of FIG. 7A to ② of FIG. 7C so that processing for the correction and absorption of rotational speed variation is effected by steps of FIG. 7C.

The processing for the correction and absorption of rotational speed variation of FIG. 7C will be described. This processing is periodically executed by the further interrupt service routine at every fourth 45° CA interruption, and therefore engine rotational speed data N1 to N4 for each 45° CA timing has been stored in the RAM 107 by the time of starting the processing of the further interrupt service routine. In steps 140 and 141, the data $N_L$ and $N_H$, which have been already obtained by the above-described majority decision and the regarding executed in the steps 135 and 136, are read out. In the example of FIG. 4, N4 and N2 are respectively read out as the values of $N_L$ and $N_H$. Then in a step 142, the difference between $N_H$ and $N_L$ is obtained as $\Delta Ni = N_H - N_L$. Namely, the rotational speed difference between the maximum and minimum values during 180° CA rotation for the newest power stroke is obtained. This difference represents an amount of increment caused from the newest power stroke. This increment $\Delta Ni$ in rotational speed is compared with two predetermined values X and Y prestored in the ROM 108 to determine whether $\Delta Ni$ is within a range from X to Y. In the case that $\Delta Ni$ is out of the range, it is regarded that 45° CA interruption timing or data of the RAM 107 is abnormal. Therfore, majority decision is to be effected again. To this end the marjority decision starting flag is turn off or set to logic "0" in a step 145, and the majority decision-completed flag is also turned off or set to logic "0" in a step 146. After the execution of the steps 145 and 146 the further interrupt service routine is terminated.

Turning back to the step 144, when the value of $\Delta Ni$ is detected to be within the range from X to Y, namely, when $\Delta Ni$ assumes a normal value, newest four data of $\Delta Ni$ including the value $\Delta Ni$ just obtained in the step 142 are averaged in a step 143 to obtain a mean value $\Delta \overline{N}$. After the mean value $\Delta \overline{N}$ is obtained, the difference between each increment $\Delta Ni$ and the mean value $\Delta \overline{N}$ is calculated to see how much the increment due to the newest combustion differs from the mean value $\Delta \overline{N}$. This difference is expressed by dNi, and is referred to as a deviation. The deviation dNi is used in a step 148 to search and obtain a fuel injection correction amount e by picking up one value from a map within the ROM 108. Namely, a plurality of values of correction amounts e are prestored in the ROM 108 in the form of a map in correspondence with value of the deviations dNi. The relationship between the value of the correction amount e and the value of the deviation dNi may be represented by a curve in graph shown at the right of FIG. 7C. When the correction amount e is determined in this way, the correction amounts e1 to e4 stored in the RAM 108 are read out to be corrected by adding the correction amount e in a step 149. Namely, correction amounts ei for four cylinders are increased as ei=ei+e. In this way the values of correction amounts e1 to e4 are respectively renewed. Then the step 150 and the step 151, if necessary, are executed to reset the value of "i" to zero when i=4 before terminating the further interrupt service routine.

The fuel injection correction amounts e1 to e4 for respective cylinders are renewed in this way, and these updated correction amounts ei are used in the processing of the above-described main routine of FIG. 6 so that fuel injection amount for individual cylinder is respectively controlled in a different manner. As the above-described processing is repeatedly executed, the amount of fuel injected into a cylinder, where the rotational speed increment is greater than the mean value, is reduced step by step, while the amount of fuel injected into a cylinder, where the rotational speed increment is smaller than the mean value, is increased step by step. With such fuel amount control, the amount of increment will be common to all the cylinders finally. As a result, the rotational torque produced by respective cylinders becomes uniform throughout the cylinders, and thus extremely smooth rotation of the engine can be achieved.

Figure 7C:
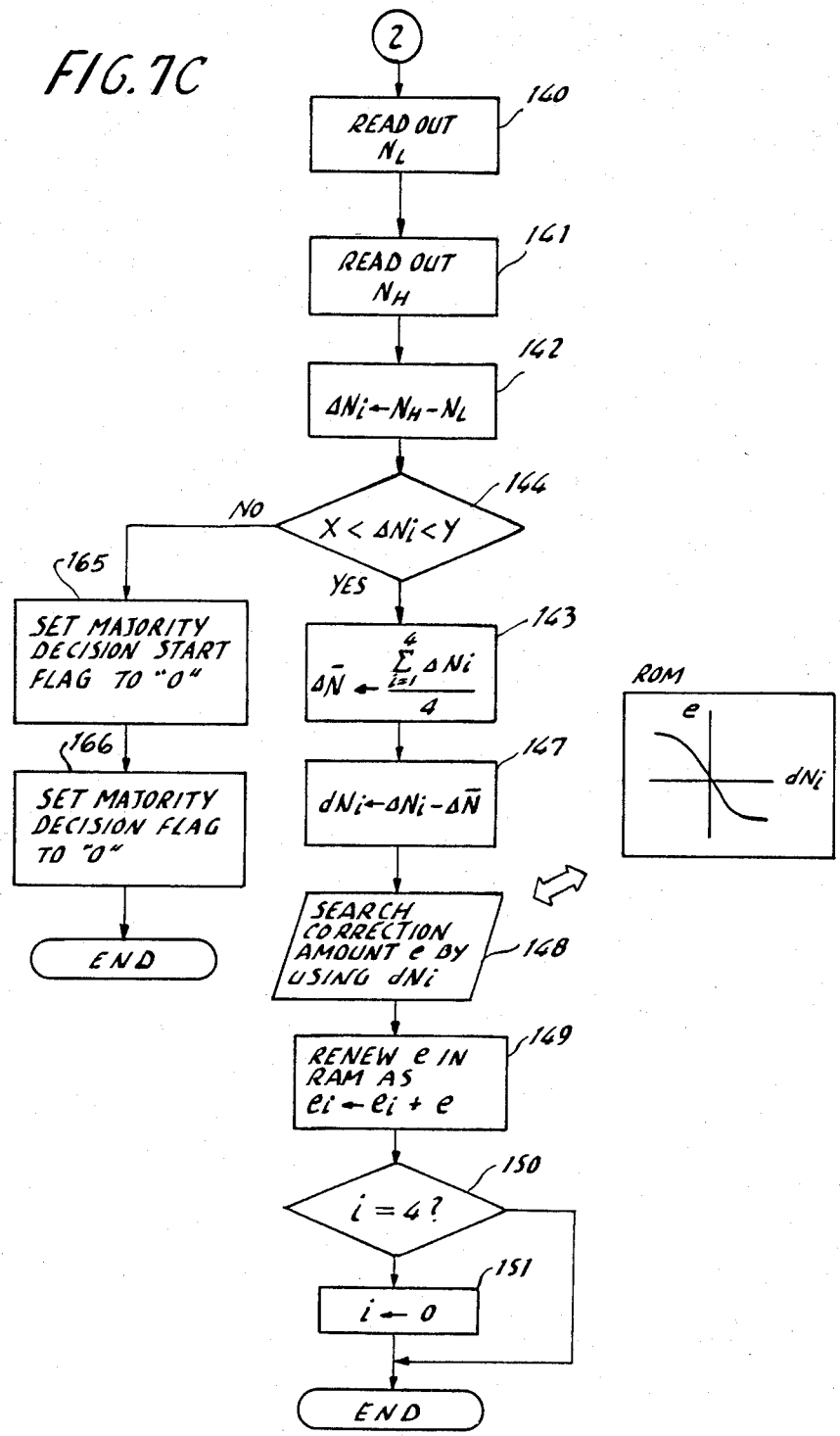
Figure 8:
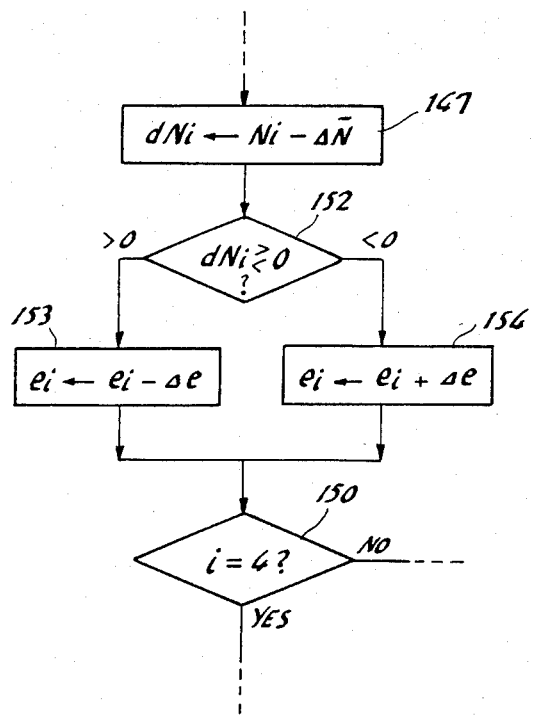
FIG. 8 shows a part of a flowchart, which may be used in place of some steps of the interrupt service routine of FIG. 7 for providing another embodiment.

FIG. 8 shows another embodiment of the present invention, which embodiment differs from the above-described embodiment in that the steps 148 and 149 of FIG. 7C are replaced with another steps. In a step 152, which follows the step 147 of FIG. 7C, it is determined whether the deviation dNi is a positive value or a negative value. When positive, the correction amount ei is reduced by a small unit correction amount Δe in a step 153. On the other hand when negative, the correction amount ei is increased by the small unit correction amount Δe in a step 154. In this way the correction amounts ei stored in the RAM 107 are renewed without searching data from the map of the ROM 107. Therefore, these steps 152 to 154 may be used in place of the steps 148 and 149 to obtain a similar effect.

As described in the above, according to the present invetion since instantaneous engine rotational speed is detected at every predetermined crank angles to conjecture torque generated at each power stroke or combustion, and the amount of fuel injected into respective cylinders is controlled such that the torque is common to all the cylinders, smooth engine rotation can be obtained especially during idling without suffering from uncomfortable irregular rotation. Namely, external disturbances are effectively absorbed even if characteristics of fuel injecting nozzles, delivery valves or the like are not completely uniform throughout all the cylinders or even if intake and exhaust timings of all the cylinders have variations due to secular change or the like.

Furthermore, according to the present invention the correction of fuel injection amount is effected on the basis of majority decision, which shows the tendency of engine speed variation, the control of fuel amount is difficult to be disturbed by noises or external disturbances, thereby providing a control with high reliability.

Moreover, the present invention is advantageous since the present invention can be achieved by adding a small number of new parts, such as the toothed disc 6, to known electronically controlled distributor injection pump for diesel engines.

The above-described embodiments are just examples of the present invention, and therefore, it will be apparent for those skilled in the art that many modifications and variations may be made without departing from the spirit of the present invention.

What is claimed is:

1. A method for controlling the amount of fuel injected into a multi-cylinder engine, comprising the steps of:
    (a) detecting rotational speed of said engine at a plurality of predetermined angles of a crankshaft of said engine for producing a plurality of engine speed data whose number equals an integral multiple of the number of cylinders of said engine;
    (b) determining either maximum or minimum engine speed data among said plurality of engine speed data;
    (c) repeating the steps of detecting and determining a plurality of times which equals the number of said engine cylinders, for obtaining a plurality of sets of engine speed data;
    (d) determining the order of said engine speed data showing either maximum or minimum engine speed data within said plurality of engine speed data only when said order is common to majority of said plurality of sets of engine speed data;
    (e) obtaining the difference between a maximum engine speed and a minimum engine speed for each set of engine speed data; and
    (f) controlling the amount of fuel injected into the engine cylinders so that the difference becomes common to all the cylinders.

2. A method as claimed in claim 1, wherein the step of controlling comprises the steps of:
    (a) obtaining a mean value of said differences for said plurality of sets of engine speed data;
    (b) comparing each of said differences with said mean value for obtaining deviation of each of said differences from said mean value;
    (c) reducing the amount of fuel to be injected when the difference is greater than said mean value; and
    (d) increasing the amount of fuel to be injected when the difference is smaller than said means value.

3. A method as claimed in claim 2, wherein each of said steps for reducing or increasing the amount of fuel comprises the steps of:
    (a) reading out prestored data from a memory in accordance with the deviation; and
    (b) renewing a variable by adding data read out from said memory.

4. A method as claimed in claim 2, wherein each of said steps for reducing or increasing the amount of fuel comprises the steps of:
    (a) determining whether said deviation is either a positive value or a negative value;
    (b) decreasing a variable by a unit amount when said deviation is a positive value; and
    (c) increasing said variable by a unit amount when said deviation is a negative value.

5. Apparatus for controlling the amount of fuel injected into a multi-cylinder engine, comprising:
    (a) means for detecting rotational speed of said engine at a plurality of predetermined angles of a crankshaft of said engine for producing a plurality of engine speed data whose number equals an integral multiple of the number of cylinders of said engine;
    (b) means for detecting operational parameters of said engine;
    (c) computing means for
        determining either maximum or minimum engine speed data among said plurality of engine speed data;
        repeating the step of determining a plurality of times which equals the number of said engine cylinders, for obtaining a plurality of sets of engine speed data;
        determining the order of said engine speed data showing either maximum or minimum engine speed data within said plurality of engine speed data only when said order is common to majority of said plurality of sets of engine speed data;
        obtaining the difference between a maximum engine speed and a minimum engine speed for each set of engine speed data;
        producing correction amounts, which will cause the increase or decrease of the amount of fuel, for each set of said engine speed data so that the difference becomes common to all the cylinders; and
        producing a control signal by calculating a basic fuel injection amount by using said engine operational parameters and subsequently correcting said basic fuel injection amount by said correction amount; and
    (d) means for controlling the amount of fuel injected into the engine cylinders in accordance with said control signal.

6. Apparatus as claimed in claim 5, wherein said computing means is arranged to execute the steps of:
    (a) obtaining a mean value of said differences for said plurality of sets of engine speed data;

(b) comparing each of said differences with said mean value for obtaining deviation of each of said differences from said mean value;

(c) reducing the amount of fuel to be injected when the difference is greater than said mean value; and (d) increasing the amount of fuel to be injected when the difference is smaller than said means value.

7. Apparatus as claimed in claim 6, wherein said computing means is arranged to execute each of said steps for reducing or increasing the amount of fuel by executing the steps of:

(a) reading out prestored data from a memory in accordance with the deviation; and (b) renewing a variable by adding data read out from said memory.

8. Apparatus as claimed in claim 6, wherein said computing means is arranged to execute each of said steps for reducing or increasing the amount of fuel by executing the steps of:

(a) determining whether said deviation is either a positive value or a negative value;

(b) decreasing a variable by a unit amount when said deviation is a positive value; and (c) increasing said variable by a unit amount when said deviation is a negative value.

9. Apparatus as claimed in claim 1, wherein said means for detecting comprises:

(a) a toothed disc arranged to rotate in synchronization with the engine cranshaft; and (b) an electromagnetic pickup responsive to the passage of each tooth of said disc.

10. Apparatus as claimed in claim 1, wherein said means for controlling comprises a distributor injection pump having a spill ring arranged to be moved by an electromagnetic actuator responsive to said control signal.

* * * * *